(12) United States Patent
Knausdorf et al.

(10) Patent No.: US 12,208,616 B2
(45) Date of Patent: Jan. 28, 2025

(54) INSPECTION SYSTEM FOR THREE-DIMENSIONAL PRINTER AND METHODS THEREOF

(71) Applicant: Additive Technologies, LLC, Palm City, FL (US)

(72) Inventors: Peter Knausdorf, Henrietta, NY (US); Sakib Zargar, Raleigh, NC (US); Joseph C. Sheflin, Macedon, NY (US); Palghat S. Ramesh, Pittsford, NY (US); Collin Alexander Ladd, Charlotte, NC (US); Chu-Heng Liu, Penfield, NY (US); Paul J. McConville, Webster, NY (US)

(73) Assignee: ADDITIVE TECHNOLOGIES, LLC, Palm City, FL (US)

( * ) Notice: Subject to any disclaimer, the term of this patent is extended or adjusted under 35 U.S.C. 154(b) by 238 days.

(21) Appl. No.: 18/059,643

(22) Filed: Nov. 29, 2022

(65) Prior Publication Data

US 2024/0173972 A1 May 30, 2024

(51) Int. Cl.
*B41J 2/045* (2006.01)
*G06T 7/00* (2017.01)
(Continued)

(52) U.S. Cl.
CPC .......... *B41J 2/0456* (2013.01); *G06T 7/0004* (2013.01); *G06V 10/25* (2022.01); *G06V 10/764* (2022.01); *G06V 10/82* (2022.01)

(58) Field of Classification Search
CPC ........ B41J 2/0456; G06T 7/0004; G06T 7/11; G06T 2207/00; G06T 2207/30144; G06V 10/25; G06V 10/82; G06V 10/764
See application file for complete search history.

(56) References Cited

U.S. PATENT DOCUMENTS

| 2006/0115127 A1* | 6/2006 | Hatayama | G06V 10/993 382/112 |
| 2015/0170355 A1* | 6/2015 | Yoshida | G01N 21/9501 382/145 |

(Continued)

FOREIGN PATENT DOCUMENTS

WO 2020/061544 A1 3/2020

*Primary Examiner* — Anh T Vo
(74) *Attorney, Agent, or Firm* — MH2 TECHNOLOGY LAW GROUP, LLP

(57) ABSTRACT

A printing system and method of inspecting drop ejection in a printing system is disclosed. The method includes capturing an image of each of a plurality of drops of a print material after ejection from an ejector of a printing system, creating a temporally averaged image from each image of the plurality of drops of print material, and classifying one of the plurality of drops of print material based on the temporally averaged image that was created. The use of a pretrained convolutional neural network for classifying one of the plurality of drops and comparing the temporally averaged image to another temporally averaged image to classify one of the plurality of drops may be employed. The printing system also includes a camera with a high-speed shutter where the shutter is synchronized to an ejector pulse, and a video analytic framework coupled to the ejector and the camera configured to generate a jetting result for each of the one or more drops of liquid print material.

29 Claims, 9 Drawing Sheets

(51) Int. Cl.
  *G06V 10/25* (2022.01)
  *G06V 10/764* (2022.01)
  *G06V 10/82* (2022.01)

(56) References Cited

U.S. PATENT DOCUMENTS

2021/0304393 A1* 9/2021 Ota ................... G06T 11/001
2022/0134776 A1* 5/2022 Ko ..................... B41J 2/155
                                                347/1

* cited by examiner

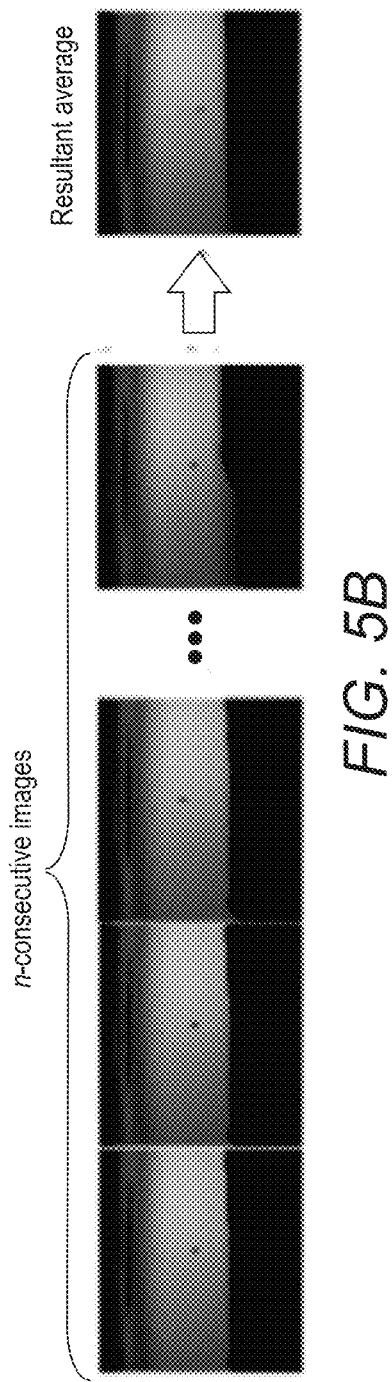

INSPECTION SYSTEM FOR THREE-DIMENSIONAL PRINTER AND METHODS THEREOF

TECHNICAL FIELD

The present teachings relate generally to liquid ejectors in drop-on-demand (DOD) printing and, more particularly, to an inspection system and methods for evaluating quality within a DOD printer.

BACKGROUND

A drop-on-demand (DOD) or three-dimensional (3D) printer builds (e.g., prints) a 3D object from a computer-aided design (CAD) model, usually by successively depositing material layer upon layer. A drop-on-demand (DOD) printer, for example, one that prints a metal or metal alloy, ejects a small drop of liquid aluminum alloy when a firing pulse is applied. Using this technology or others using various printing materials, a 3D part can be created by ejecting a series of drops which bond together to form a continuous part. For example, a first layer may be deposited upon a substrate, and then a second layer may be deposited upon the first layer. One particular type of 3D printer is a magnetohydrodynamic (MHD) printer, which is suitable for jetting liquid metal layer upon layer which bond together to form a 3D metallic object. Magnetohydrodynamic refers to the study of the magnetic properties and the behavior of electrically conducting fluids.

To build a part of high quality, precise drop placement must be maintained. To maintain precise drop placement the timing of the drop must be both consistent and directionally stable so as not to be randomly placed. Jetting quality can be influenced by complex electro-thermo-fluid dynamics in an MHD pump or ejector. During printing of a part, the pump dynamics can change due to dross build-up, contamination of the pump walls or front face or nozzle opening, leading to intermittent or systematic degradation in jetting quality. This can compromise the part quality in terms of geometry, surface finish, mechanical strength, or a combination thereof. If jetting becomes unstable or changes directionality, a less than optimum part will be built. In the case of magnetohydrodynamic (MHD) printers, the drops can be traveling at speeds of four meters per second or faster, which can be too fast for any operator to observe unaided without strobe lighting or a high-speed camera system. Even if the operator uses a hand-held strobe light to observe and characterize jetting quality, they can only do so periodically, and results are still subject to subjective interpretation. A high-speed camera system running at a high frame rate such as 10,000 frames per second could record jetted drops accurately but can be prohibitively expensive and use a high bandwidth of processing power to both record and analyze the data.

Towards this end an inspection system is needed to determine if both consistency of drops and drop placement are being achieved. A low-cost system that rates the jetting quality of drops is beneficial to maintaining part quality. An automated real time system to track jetting quality can serve to ensure the integrity of the part, where any anomalies can be flagged to the operator for timely service interventions.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A method of inspecting drop ejection in a printing system is disclosed. The method includes capturing an image of each of a plurality of drops of a print material after ejection from an ejector of a printing system, creating a temporally averaged image from each image of the plurality of drops of print material, and classifying one of the plurality of drops of print material based on the temporally averaged image that was created. Implementations of the method of inspecting drop ejection in a printing system may include using a pretrained convolutional neural network for classifying one of the plurality of drops. The method may include comparing the temporally averaged image to another temporally averaged image to classify one of the plurality of drops. The method may include extracting a region of interest (ROI) from the image of each of the plurality of drops of print material. Extraneous image data is reduced from one or more areas of the image surrounding each of the plurality of drops of print material. The method may include extracting a region of interest (ROI) from the temporally averaged image from each image of the plurality of drops of print material. Extraneous image data is reduced from one or more areas of the temporally averaged image surrounding each image of the plurality of drops of print material. The method may include capturing of the image of each of a plurality of drops of print material after ejection by from about 1 ms to about 200 ms. The method may include illuminating a space between the ejector and a substrate where a three-dimensional part is being built. The illuminating is done continuously. The method may include indicating an unstable jetting result, pausing an operation of the printing system, and performing an intervention on the printing system. The print material may include a metal, a metallic alloy, or a combination thereof, such as for example, aluminum.

Another method of inspecting drop ejection in a printing system is disclosed, including capturing an image of each of a plurality of drops of print material after ejection from an ejector of a printing system. The method also includes creating a temporally averaged image from each image of the plurality of drops of print material, extracting a region of interest (ROI) from each temporally averaged image from each image of each of the plurality of drops of print material, and alternatively includes comparing the region of interest (ROI) from a first temporally averaged image to a region of interest (ROI) from a second temporally averaged image to generate a jetting result. The method also includes classifying the jetting result of one of the plurality of drops of print material.

Implementations of the method of inspecting drop ejection in a printing system may include indicating an unstable jetting result, pausing an operation of the printing system, and performing an intervention on the printing system. The method may include using a pretrained convolutional neural network for classifying the jetting result of one of the plurality of drops of print material. The method may include capturing of the image of each of a plurality of drops of print material after ejection by from about 1 ms to about 200 ms. The method may include continuously illuminating a space between the ejector and a substrate where a three-dimensional part is being built. Extraneous image data is reduced from one or more areas of each image of the plurality of drops of print material.

A printing system is disclosed that includes an ejector for jetting a print material, a structure defining an inner cavity, and a nozzle orifice in connection with the inner cavity and configured to pulse to eject one or more drops of liquid print material. The printing system also includes a camera which may include a high-speed shutter where the shutter is synchronized to an ejector pulse. The printing system also includes a video analytic framework coupled to the ejector and the camera configured to generate a jetting result for each of the one or more drops of liquid print material. The printing system may include a substrate for receiving one or more drops of liquid print material. The camera is located in a plane between the ejector and the substrate. The printing system may include a continuous illumination source configured to illuminate a space between the ejector and the substrate. The printing system may include an electronic circuit connecting the camera to the ejector and configured to trigger the camera after a pulse to eject one or more drops of liquid print material. The camera is triggered 1 ms to about 200 ms after the pulse to eject one or more drops of liquid print material. The camera further may include a long-length focal lens. The video analytic framework produces an image extraction to generate a jetting result for each of the one or more drops of liquid print material. The image extraction is a temporal average of more than one image. The print material may include a metal, a metallic alloy, or a combination thereof.

The features, functions, and advantages that have been discussed can be achieved independently in various implementations or can be combined in yet other implementations further details of which can be seen with reference to the following description.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures:

FIGS. 5A and 5B include a series of temporal averaging of captured images for stable jetting and unstable jetting, respectively, in accordance with the present disclosure.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary examples of the present teachings, examples of which are illustrated in the accompanying drawings. Wherever possible, the same reference numbers will be used throughout the drawings to refer to the same, similar, or like parts.

Examples of the present disclosure provide a camera having a high-speed shutter system to evaluate jetting performance in a 3D printing system. The use of a lower cost machine vision camera that has the ability to capture images in short shutter times, as short as, but not limited to, 10 microseconds, combined with the capability to be externally triggered via an electronic signal. To maintain a lower system cost, the camera does not need the ability to record high frame rates such as a typical high-speed camera would, due to the fact that the camera is synchronized to the drop jetting via an external synch input on the camera. This allows for capturing images at exact times, where fewer images or frames are needed to determine jetting quality. The present disclosure further includes a video analytics framework to analyze the high-speed shutter images in real time to estimate a jetting score, which can discriminate between stable jetting quality and unstable jetting quality. The video analytics framework performs an ROI (Region of Interest) extraction of the drops from temporally averaged video frames and classifies the drop behavior into predetermined jetting stability categories. The video analytics framework is specifically constructed to provide real time processing of the video frames without need for specialized computing hardware (e.g. GPUs), and provide an option for a low complexity high speed shutter system with video analytics software to be attached to a printing system for real time inspection of a part quality as they are being printed.

Figure 1:
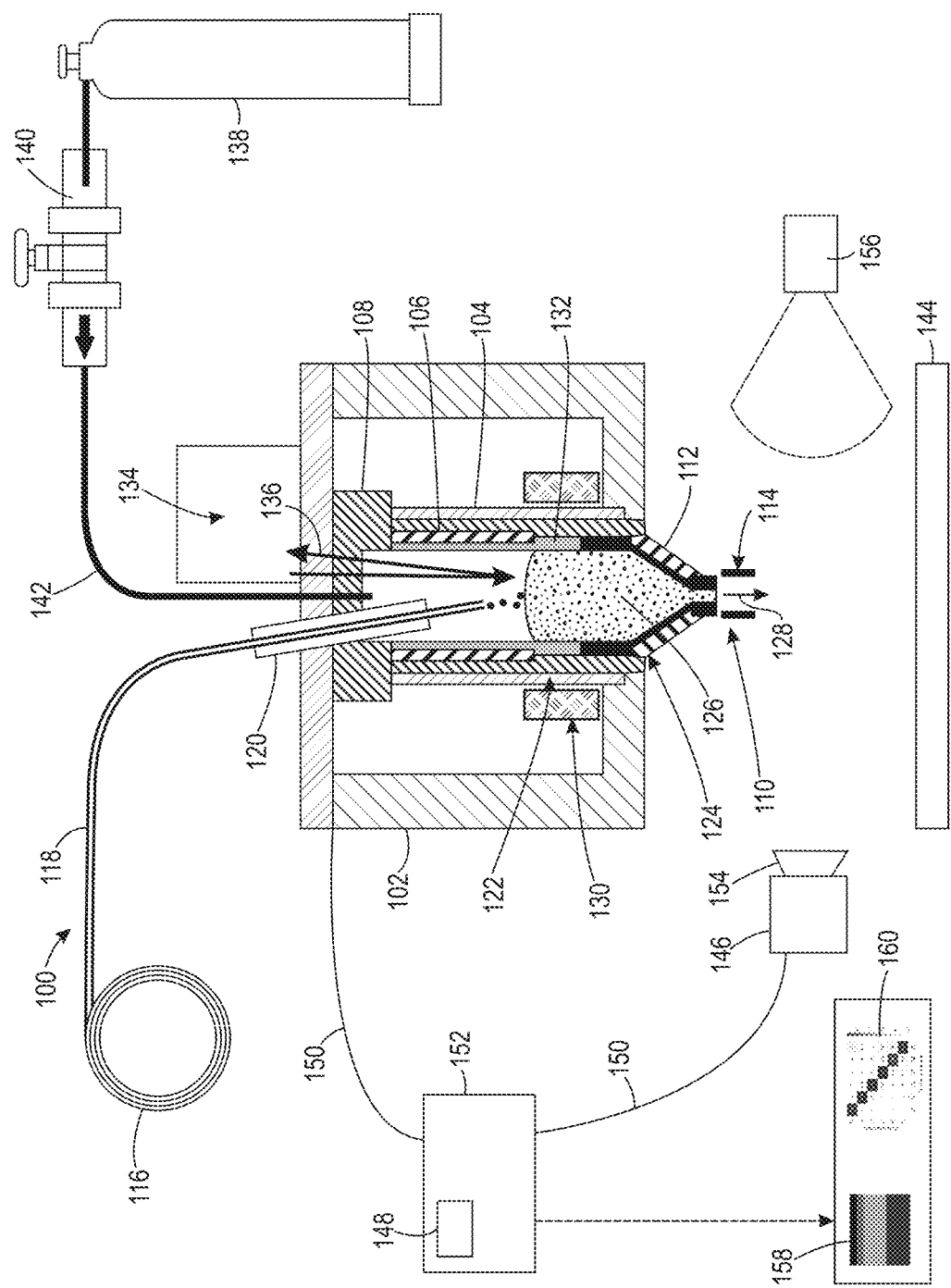
FIG. 1 depicts a schematic cross-sectional view of a single liquid metal ejector jet of a 3D printer (e.g., a MHD printer and/or multi-jet printer), in accordance with the present disclosure.

FIG. 1 depicts a schematic cross-sectional view of a single liquid metal ejector jet of a 3D printer (e.g., a MHD printer and/or multi-jet printer), in accordance with the present disclosure. FIG. 1 shows a portion of a type of drop-on-demand (DOD) or three-dimensional (3D) printer 100. The 3D printer or liquid ejector jet system 100 may include an ejector (also referred to as a body or pump chamber, or a "one-piece" pump) 104 within an outer ejector housing 102, also referred to as a lower block. The ejector 104 can be defined as an inner volume 132 (also referred to as an internal cavity or an inner cavity). The ejector 104 can be defined as a structure that can be selectively activated in such a manner as to cause a build material, print material to be ejected from a nozzle 110 of the ejector. The nozzle 110 can be defined as a physical structure of the ejector from which a build material or print material takes flight. A printing material 126 may be introduced into the inner volume 132 of the ejector 104. The printing material 126 may be or include a metal, a polymer, or the like. It should be noted that alternate jetting technology aside from MHD as described herein may be necessary depending on the nature and properties of the print material used in examples of the present disclosure. For example, the printing material 126 may be or include aluminum or aluminum alloy, introduced via a printing material supply 116 or spool of a printing material wire feed 118, in this case, an aluminum wire. The liquid ejector jet system 100 further includes a first inlet 120 within a pump cap or top cover portion 108 of the ejector 104 whereby the printing material wire feed is introduced into the inner volume 132 of the ejector 104. The ejector 104 further defines a nozzle 110, an upper pump 122 area and a lower pump 124 area. One or more heating elements 112 are distributed around the pump chamber 104 to provide an elevated temperature source and maintain the printing material 126 in a molten state during printer operation. The heating elements 112 are configured to heat or melt the printing material wire feed 118, thereby changing the printing material wire feed 118 from a solid state to a liquid state (e.g., printing material 126) within the inner volume 132 of the ejector 104. The three-dimensional 3D printer 100 and ejector 104 may further include an air or argon shield 114 located near the nozzle 110, and a water coolant source 130 to further enable nozzle and/or ejector 104 temperature regulation. The liquid ejector jet system 100 further includes a level sensor 134 system which is configured to detect the level of molten printing material 126 inside the inner volume 132 of the ejector 104 by directing a detector beam 136 towards a surface of the printing material 126 inside the ejector 104 and reading the reflected detector beam 136 inside the level sensor 134.

The 3D printer 100 may also include a power source, not shown herein, and one or more metallic coils 106 enclosed in a pump heater that are wrapped at least partially around the ejector 104. The power source may be coupled to the coils 106 and configured to provide an electrical current to the coils 106. An increasing magnetic field caused by the coils 106 may cause an electromotive force within the ejector 104, that in turn causes an induced electrical current in the printing material 126. The magnetic field and the induced electrical current in the printing material 126 may create a radially inward force on the printing material 126, known as a Lorenz force. The Lorenz force creates a pressure at an inlet of a nozzle 110 of the ejector 104. The pressure causes the printing material 126 to be jetted through the nozzle 110 in the form of one or more liquid drops 128.

The 3D printer 100 may also include a substrate 144, that is positioned proximate to (e.g., below) the nozzle 110. The substrate 144 may include a heating element, or alternatively be constructed of brass or other materials. In certain examples, the substrate 144 may further include a build plate made of brass which can be coated with nickel to promote the wetting of molten aluminum droplets when they impinge on the build plate. The ejected drops 128 may land on the substrate 144 and solidify to produce a 3D object. The 3D printer 100 may also include a substrate control motor that is configured to move the substrate 144 while the drops 128 are being jetted through the nozzle 110, or during pauses between when the drops 128 are being jetted through the nozzle 110, to cause the 3D object to have the desired shape and size. The substrate control motor may be configured to move the substrate 144 in one dimension (e.g., along an X axis), in two dimensions (e.g., along the X axis and a Y axis), or in three dimensions (e.g., along the X axis, the Y axis, and a Z axis). In another example, the ejector 104 and/or the nozzle 110 may be also or instead be configured to move in one, two, or three dimensions. In other words, the substrate 144 may be moved under a stationary nozzle 110, or the nozzle 110 may be moved above a stationary substrate 144. In yet another example, there may be relative rotation between the nozzle 110 and the substrate 144 around one or two additional axes, such that there is four or five axis position control. In certain examples, both the nozzle 110 and the substrate 144 may move. For example, the substrate 144 may move in X and Y directions, while the nozzle 110 moves up and/or down in a Z direction. In case of a nozzle 110 moving, the nozzle 110 and other printhead assembly components can include a nozzle or printhead motor control, not shown herein.

The 3D printer 100 may also include one or more gas-controlling devices, which may be or include a gas source 138. The gas source 138 may be configured to introduce a gas. The gas may be or include an inert gas, such as helium, neon, argon, krypton, and/or xenon. In another example, the gas may be or include nitrogen. The gas may include less than about 10% oxygen, less than about 5% oxygen, or less than about 1% oxygen. In at least one example, the gas may be introduced via a gas line 142 which includes a gas regulator 140 configured to regulate the flow or flow rate of one or more gases introduced into the three-dimensional 3D printer 100 from the gas source 138. For example, the gas may be introduced at a location that is above the nozzle 110 and/or the heating element 112. This may allow the gas (e.g., argon) to form a shroud/sheath around the nozzle 110, the drops 128, the 3D object, and/or the substrate 144 to reduce/prevent the formation of oxide (e.g., aluminum oxide) in the form of an air shield 114. Controlling the temperature of the gas may also or instead help to control (e.g., minimize) the rate that the oxide formation occurs.

The liquid ejector jet system 100 may also include an enclosure 102 that defines an inner volume (also referred to as an atmosphere). In one example, the enclosure 102 may be hermetically sealed. In another example, the enclosure 102 may not be hermetically sealed. In one example, the ejector 104, the heating elements 112, the power source, the coils, the substrate 144, additional system elements, or a combination thereof may be positioned at least partially within the enclosure 102. In another example, the ejector 104, the heating elements 112, the power source, the coils, the substrate 144, additional system elements, or a combination thereof may be positioned at least partially outside of the enclosure 102. While the liquid ejector jet system 100 shown in FIG. 1 is representative of a typical liquid ejector jet system 100, locations and specific configurations and/or physical relationships of the various features may vary in alternate design examples.

Printing systems as described herein may alternatively include other printing materials such as plastics or other ductile materials that are non-metals. The print material may include a metal, a metallic alloy, or a combination thereof. A non-limiting example of a printing material may include aluminum. Exemplary examples of printing systems of the present disclosure may include an ejector for jetting a print material, including a structure defining an inner cavity, and a nozzle orifice in connection with the inner cavity and configured to eject one or more droplets of liquid print material, wherein the ejector is configured to print a first layer of a three-dimensional printed part from a standoff position relative to the substrate 144 and the ejector is configured to print one or more remaining layers onto the first layer from a z-height position relative to a top surface of the first layer.

Figure 2:
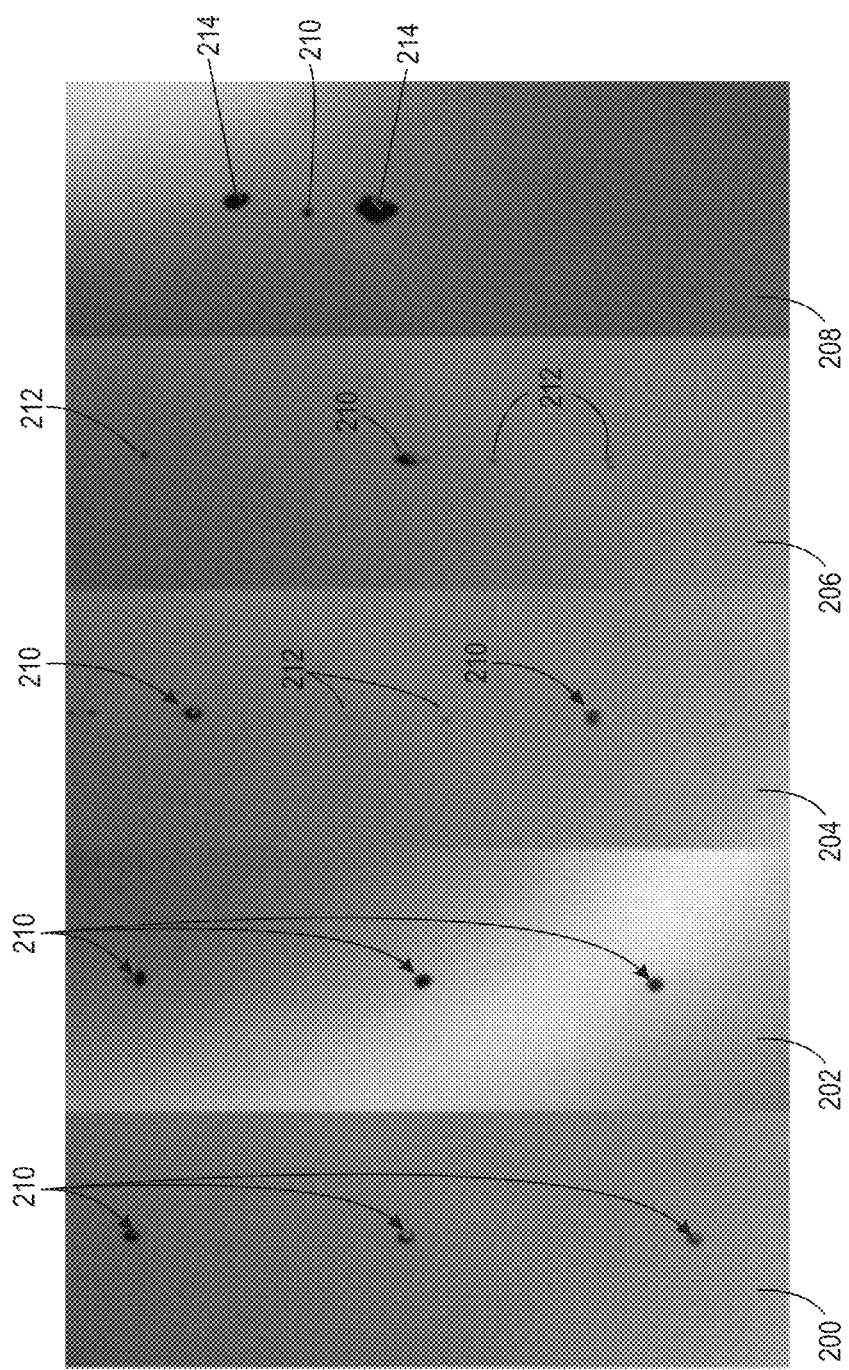
FIG. 2 is a series of photographic images demonstrating different jetting qualities, in accordance with the present disclosure.

FIG. 1 further includes a camera 146 which includes an integrated high-speed shutter, not shown herein, where the shutter is synchronized to be triggered to an ejector pulse that causes a drop of printing material to be ejected from the nozzle 110 of the ejector 104; the camera is located in a plane between the ejector 104 and the substrate 144. The camera 146 also includes a long-length focal lens 154, capable of effectively capturing a clear image of a drop in flight between the ejector 104 and the substrate 144, or ejector 104 and a three-dimensional part being built by the printer 100. In certain exemplary printing systems, this space can be, but is not limited to, approximately 8 mm in a vertical direction. The printing system 100 also includes a continuous illumination source 156 which illuminates a space between the ejector and the substrate 144. While the illumination source 156 can be continuous, the illumination source 156 may alternatively be intermittent and only in use when the shutter for the camera 146 is triggered. Coupled to the printer 100 or the ejector 104 and the camera 146 is a video analytic framework 148 coupled by an electronic circuit 150 connecting the camera 146 to the ejector 104. The video analytic framework 148 is configured to trigger the camera 146 after a pulse to eject one or more drops of liquid print material. The video analytic framework 148 is a part of or is coupled to a computer 152, which are utilized to generate a jetting result for each of the one or more drops of liquid print material that is ejected in the formation of a three-dimensional part. The video analytic framework 148 produces an image extraction 158 to generate a jetting result 160 for each of the one or more drops of liquid print material. In certain examples, the image extraction is a temporal average of more than one image which may represent more than one drop that is ejected. FIG. 2 is a series of photographic images demonstrating different jetting qualities, in accordance with the present disclosure. The set of photographic images 200, 202, 204, 206, 208 represent drops having different jetting quality. Ideal jetting has stable monolithic drops as in the first image 200. Ideal drops 210 are stable in all dimensions of X, Y and Z, meaning they always hit the same cartesian coordinate (X, Y) and in the Z direction drops are stable in their velocity. For the Z axis, if an image of a stable drop is captured at a fixed time, for example a delay of 2 milli-seconds after it is triggered to jet, it will always be at the same distance from the exit of the ejecting nozzle. If jetting degrades, drops will deviate from their monolithic behavior and may develop smaller satellite drops 212 as seen in image 204. Further degradation leads to a sputtering of the jetting as seen in image 208 which includes large globules 214 among intended drops 210. The jetting scores of 1 through 5 is assigned to these images 200, 202, 204, 206, 208, with 1 being the best, as shown in image 200, and 5 being the worst jetting, as demonstrated by image 208. Sampling of a number of images have a very distinct pattern that typically correspond to one of these jetting scores, both in still images and in live jetting. By observing the jetting with a camera setup having a high-speed shutter, the quality of the jetting can be determined and acted upon with one or more interventions. The camera setup would capture jetting while the building of a part is in progress and the quality of the jetting can be determined. From a score of the quality, as shown in the images 200, 202, 204, 206, 208 in FIG. 2, from one through five, a decision can be made to determine to stop the build of the part or adjust a system parameter to improve quality. Two main parts to the system are provided, a physical camera setup and a machine vision or algorithm system that can automatically analyze the images from the camera setup and generate a score representing the quality of the jetting.

The use of a high-speed shutter system for video capture presents several challenges for capturing high quality images in such a printing system. The drops are moving quite fast with respect to the resolution required for image analysis, so motion blur of the drop needs to be kept to an acceptable level. For example, if the drops are moving at 4 meters per second (m/s) and the desired maximum motion blur is around 40 μm of travel per frame, then, this would require a shutter speed of 10 microseconds (us) to capture a sufficient image of "frozen" motion. In conventional approaches, high speed cameras and strobe lights are typically used. However, these also present certain challenges. With the use of conventional high-speed cameras, it can be used for imaging with a frame rate of approximately 100 k frames per second (fps), and thus there are no issues with capturing individual drops with high fidelity. The challenges arise in how to determine an appropriate time delay from the initiation of the firing of a drop to the relative sequence of frames needed, as well as the higher expense of such systems. With the use of a strobe light synched to the jetting pulse, this can solve the time delay determination problem, as each strobe is synched to the jetting pulse with a known delay. However, there are also challenges with image quality with such systems.

At jetting frequencies of approximately 300 Hz, which are much higher than typical video frame rates and exposure times, each video frame can capture multiple strobes. For example, at a 30 frame per second video rate, each video frame will capture around 10 strobes, which implies that the strobe images of 10 separated drops are superimposed in a single video frame. The resulting image from a single video frame is therefore not from a single drop. Furthermore, strobe light systems also add significant costs to an image capture and analysis system. It should be noted that a primary difference between a high speed camera system and the lower cost camera system of the present disclosure is not the shutter speed but rather the "frames per second" (fps) at which each is capable of running. While a typical high speed video system could be capable of capturing 100 k frames at a 10 us shutter speed—it is only the faster shutter speed that is required for clear images. Even a synchronous video system running at 10 fps showing "frozen" drops can provide clear pictures having very little appreciable motion blur that are analyzable. Useful shutter speeds for the system of the present disclosure range from less than 5 us to 100 us depending on the speed and size of the drop being ejected. Useful frame rates range from less than 1 fps to upwards of 250 fps.

Figure 3:
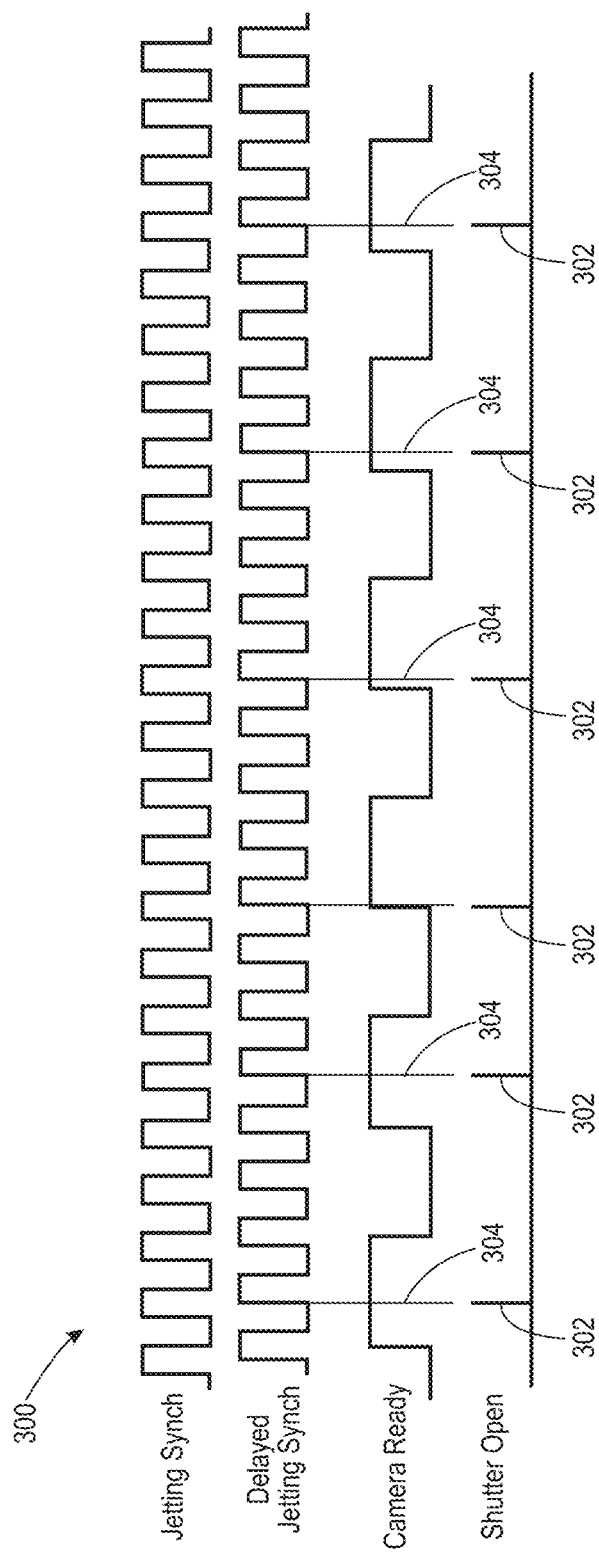
FIG. 3 is a schematic depicting camera synchronization signals as compared to a timing of other printing system parameters, in accordance with the present disclosure.

FIG. 3 is a schematic depicting camera synchronization signals as compared to a timing of other printing system parameters, in accordance with the present disclosure. With the use of a digital camera with a long focal length lens which uses continuous lighting, this digital camera does not necessarily require high throughput, high bandwidth, or high frame rates, it can have the capability to be triggered externally so as to be synchronous with the actual jetting. The present disclosure provides a camera system operating with a lower bandwidth and frames per second (fps) frame rate, and consequently, the cost of the camera can be lower than a full high bandwidth and fps system. Thus, an external synch pulse triggers the camera to capture an image. In certain examples, the pulse can be the same timing pulse used to trigger actual jetting. Utilizing this method, the camera can be synchronous with the jetting. However, given the timing of the ejector and the positioning of the camera relative to the ejector nozzle, it is advantageous to have a delay between the initial jetting pulse and triggering the image capture. At time zero ($t_0$), the print head driver circuit will receive a start pulse and it will be several microseconds later that the actual drop of material is ejected from the nozzle. Additionally, the drop needs to travel far enough to be in the field of view of the camera and to have enough history to determine if there are trailing satellite drops or other visible issues. If the camera were triggered at $t_0$, it would miss the drop being jetted since the drop would not have had time to traverse the field of view of the camera. Therefore, a typical propagation time could be from about 2 milliseconds or 2000 microseconds, but it can range between 250 microseconds to 5000 microseconds, to allow the drop time to enter the field of view. This delay time can also be adjustable to accommodate a wider set of printing system conditions, including, but not limited to, various frequency ranges and different camera positions. Initially, there is a drop start pulse, a jetting synch, sent to the jetting drive circuit, the signal is then delayed n microseconds, a delayed jetting synch, at which time it triggers 304 the exposure of one image, and the shutter is open 302. This process can continue in a continuous fashion triggering image after image in a non-stop sequence with images being stored in the internal frame buffer of the camera. Images can then be retrieved from the buffer by the processor handling the jetting scoring algorithms.

As the system and camera cost is low, the camera that captures the digital images will, in most examples, have a lower frame rate than the jetting frequency being analyzed. That is, to capture every drop of a 400 Hz drop stream would require a frequency of the same or a camera capable of 400 frames per second (fps). While many cameras can do this at a full frame resolution, it is a factor that increases the price of the camera, and it is not necessary to look at every single drop to determine a jetting score. The system can still work by sampling a small portion of the drops and analyzing them. Even though the system may be jetting at 400 Hz the camera system can run at a much slower rate, for example 10 Hz, as long as the triggered images maintain the to +n-delay timing. Therefore, the system will trigger only when it has stored the previously triggered image, ignoring all trigger pulses during the storage process. The camera will then trigger on the next available drop timing pulse+n-delay. Even though the camera is only capturing $\frac{1}{40}^{th}$ of the drops being ejected, it is capturing them in a synchronous fashion. With a stable drop, as previously described in regard to FIG. 2, the drop will appear to be stationary when viewing the captured images since velocity and directionality are stable and do not change. If the drop or drops become unstable, the velocity or Z and possibly X or Y directionality or both will be altered, causing the drop to appear to move around in a captured image when observing the recorded images in sequence.

As described herein, it is not necessary for the digital camera to capture images at a high frame rate or frames per second rate. The camera does, however, require a high shutter speed, that is a speed that can accurately capture and appear to freeze the motion of the drops in space. Ejected drops can have very fast velocities, as much as 4 meters per second, which translates into 4 mm per millisecond. Therefore, if a camera has a shutter speed of $\frac{1}{1000}^{th}$ of a second, or 1 millisecond, the jetted drop would have traveled 4 mm in the time it takes to expose one image, so it would appear blurred in the captured image. A higher speed of 0.000025 milliseconds or 25 microseconds would allow the drop to travel only 0.1 mm or 100 microns prior to capture, providing a sharp enough image capture to analyze jetting quality.

As the system will be using higher shutter speeds to capture fast traveling drops a bright enough lighting system would provide adequate contrast to the recorded images. Because the camera shutter is being synced to the drops by means of an external jetting signal and a high shutter speed is being utilized there is no requirement for the lighting source to be pulsed or strobed to freeze the apparent motion of a drop. Consequently, a continuous light source, such as a LED light source, can be used. Continuous illumination sources are generally brighter than a short duration strobe light, as the strobe light tends to have a Gaussian impact in their light output duration, meaning if a pulse duration of 25 microseconds is used to stop and capture motion, then the output ramps up to peak and then down to off to achieve a short pulse. This results in less than 100% of the light output over the 25 microseconds exposure time. The continuous light source, by contrast, will already be maintained at peak output when the shutter system triggers and remain at 100% for the 25 microseconds exposure. Another advantage of a continuous light source is that they are generally less expensive than a strobe light that can put out equivalent light at short durations on the order of 25 microseconds. The illumination source is located in a space between the ejector and a substrate where a three-dimensional part is being built, and therefore can illuminate the space between the ejector and a substrate.

Figure 4:
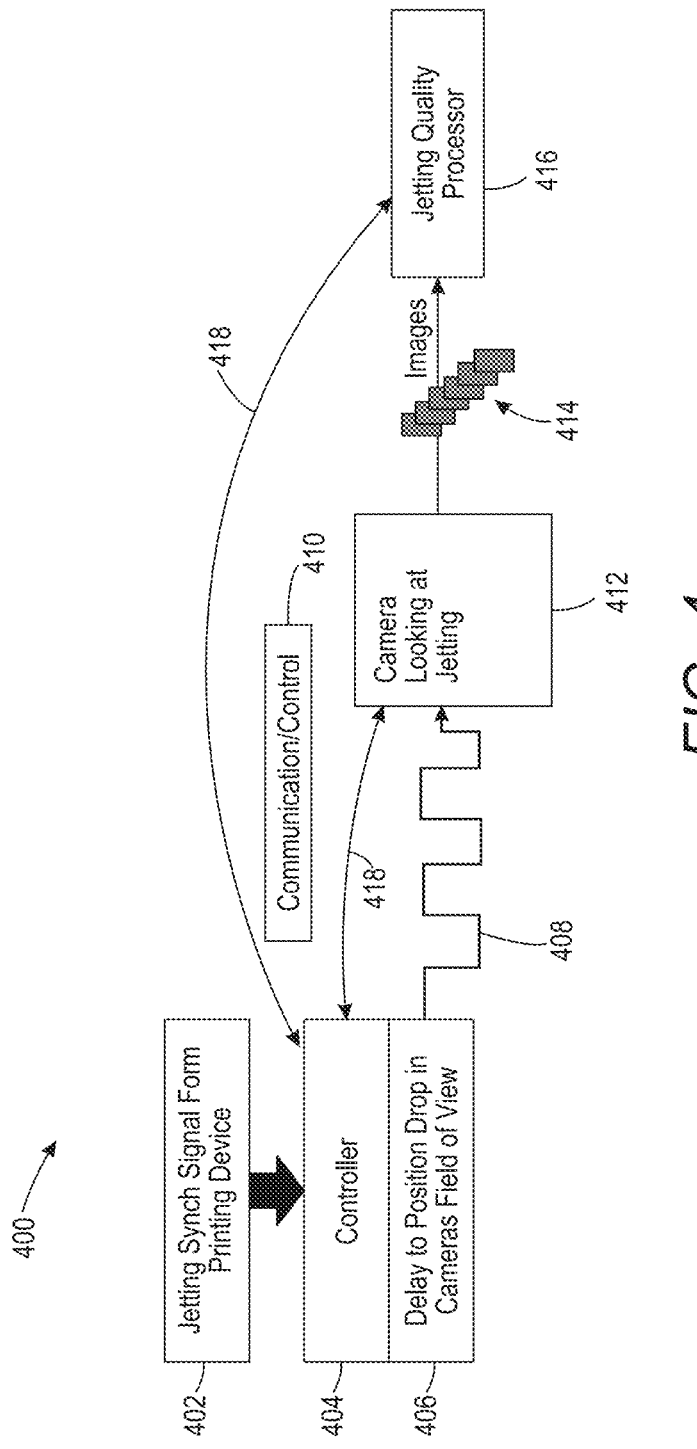
FIG. 4 is a general block diagram illustrating a proposed system for drop inspection for a printing system, in accordance with the present disclosure.

FIG. 4 is a general block diagram illustrating a proposed measurement system for drop inspection for a printing system, in accordance with the present disclosure. In addition to a camera and illumination source as previously described, a system for drop inspection for a printing system 400 includes a video analytics framework for determining jetting quality. A computer vision model provides a means that can automatically analyze and grade the images from the camera setup, including captured images of the drops during flight for real-time assessment of the jetting quality during the build process. As a plurality of drops of a print material are ejected from an ejector of a printing system, the measurement system 400 receives a jetting synch signal from the printing device 402. A controller 404 receives the jetting synch signal and delays a trigger 408 to the camera to position one or more drops within a field of view of the camera 406. The capturing of image of each drop after ejection can be delayed by from about 1 ms to about 200 ms. The camera is then instructed to capture 412 an image 414 of each of a plurality of drops of printing material after ejection. Next, a number of consecutive images 414 can be analyzed and the drop position in each image can be compared to determine the instantaneous jetting quality 416. An overall estimate of the jetting quality for a time, T can then be obtained by pooling the results over the time window T. In general, such a computer vision system must first pre-process the video stream from the camera by creating a temporally averaged image from each image of the plurality of drops of the printing material, extract the region of interest (ROI) from the camera's field of view, or a combination thereof. A trained machine learning (ML) model, such as, but not limited to a pretrained convolutional neural network, can then analyze the extracted ROIs for jetting quality assessment. This system 400, therefore, has a capability to classify or evaluate jetting stability or jetting quality such that the overall process occurs in real time. Thus, the jetting quality of at least one of the plurality of drops of printing material can be classified, based on the temporally averaged image that was created. In certain examples, a comparison of one temporally averaged image to another temporally averaged image can be used to classify one or more of the plurality of drops in terms of jetting quality. The system 400 can also be utilized for extracting a region of interest (ROI) from the image of each of the plurality of drops of printing material. A communication and control center 410 is connected by electrical connection and communication 418 to other areas of the system 400. This can be accomplished by use of a computer, microcontroller, or existing computational elements in use to operate the printing system components.

Figure 5A:
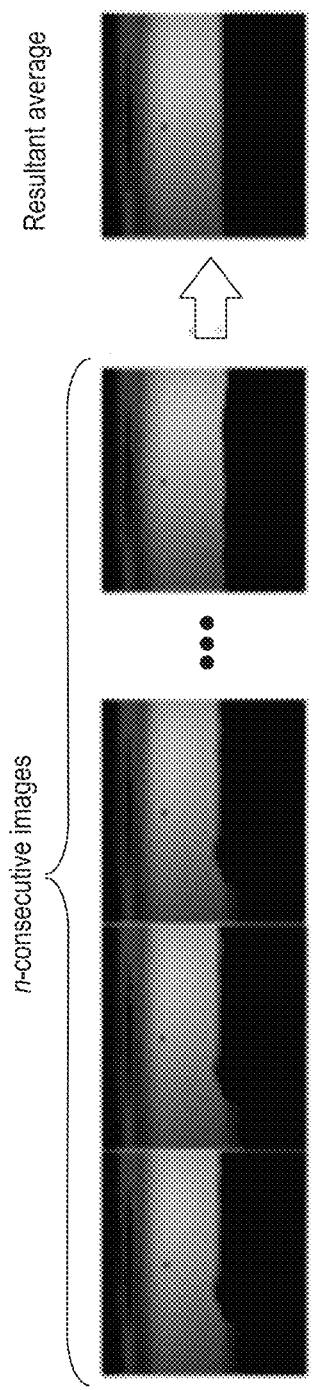

FIGS. 5A and 5B include a series of temporal averaging of captured images for stable jetting and unstable jetting, respectively, in accordance with the present disclosure. In pre-processing and ROI extraction, one way of approaching the problem i.e., looking at n-consecutive images for jetting quality assessment includes taking an average of several images and evaluate the resultant average. In this context, pre-processing can broadly include the following steps: 1. Temporal averaging. While this temporal averaging of images may lead to some information loss, it is likely that the most important features are preserved. With stable jetting, as previously described and shown in FIG. 5A, the drop will appear to just sit still across consecutive images, resulting in a solid round drop in resultant average image. As the instability increases, and jetting stability or quality decreases, the drop position keeps changing from one image to the next, resulting in distortion of the drop shape in the resultant average image as can be seen in FIG. 5B. Temporal averaging more particularly refers to averaging the data, which in this disclosure includes images, over some time horizon (k, in certain cases, approximately 10-20 frames). The temporal average image represents the average drop position over this time horizon. This is a technique for analysis of time series data, for example, video. In the present disclosure, a sliding window approach is used, where the stride (s, less than k) is the distance by which the time horizon window is moved. This provides a situation make a prediction every s capture frames, by averaging across s new frames and (k−s) previous frames.

Figure 6:
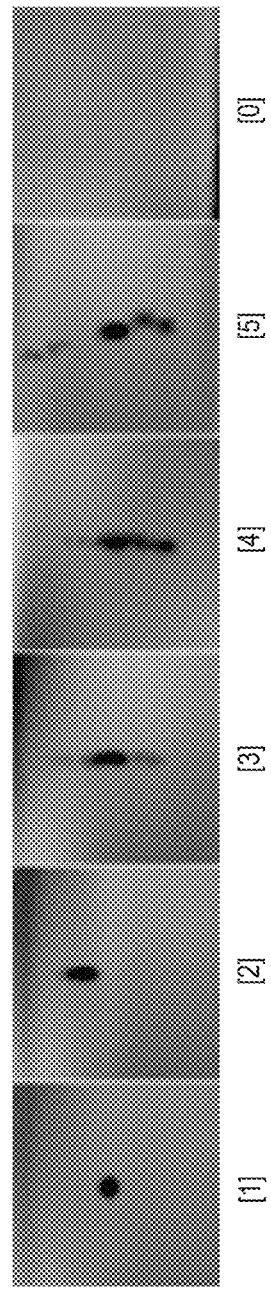
FIG. 6 is a series of photographic images from an extracted region of interest (ROI) demonstrating different jetting qualities, in accordance with the present disclosure.

FIG. 6 is a series of photographic images from an extracted region of interest (ROI) demonstrating different jetting qualities, in accordance with the present disclosure. For evaluating the jetting quality, only the region around the drop is of interest. Extracting this region from the overall field of view can not only reduce the overall computational cost but also significantly reduce the amount of data required for training a machine learning model to be used subsequent steps. As it can be challenging to control the environment in which the images are captured, the ROI extraction algorithm must be robust enough to work across different ambient conditions, for example, with the use of illumination and contrast normalization. Though not necessary, the extracted ROIs can be normalized to compensate for variations in lighting and to enhance the contrast. FIG. 6 shows examples of extracted ROIs corresponding to different jetting qualities. As previously stated, a score of 1-5, as indicated in the images shown in FIG. 6, can be used with 1 corresponding to stable jetting and 5 corresponding to the most unstable case. An additional class of score 0 could be introduced that corresponds to cases where the ROI extraction algorithm fails to identify a drop in the field of view. This, for example, can correspond to a wire feed failure. ROI extraction and image enhancement, in one such case, contrast normalization is illustrated between FIGS. 5 and 6. These steps leverage a set of image processing techniques that can be customized for the specific parameters of the printing system or application. The steps encompassed by FIGS. 5 and 6 provide input and instruction into the learning algorithm to detect and evaluate jetting quality. The raw images may include other objects such as one or more portions of the build part, the build plate, jet brackets and other system hardware features, which are removed or minimized by ROI extraction and image enhancement such that a learning algorithm can be focused on the region of the image surrounding the drop. In this manner, extraneous image data can be reduced or eliminated from an image area surrounding one of the plurality of drops of print material.

Figure 7:
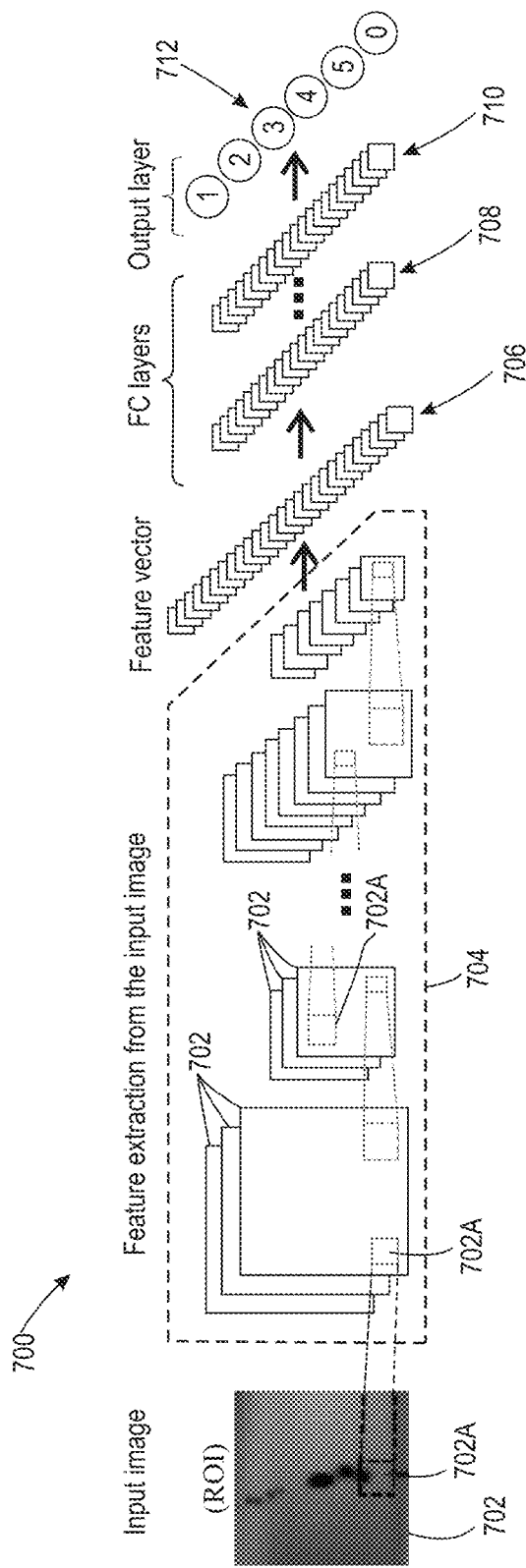
FIG. 7 is a schematic diagram of a machine learning model for real-time analysis of the extracted ROIs of FIG. 6 to be analyzed for a jetting quality assessment, in accordance with the present disclosure.

FIG. 7 is a schematic diagram of a machine learning model for real-time analysis of the extracted ROIs of FIG. 6 to be analyzed for a jetting quality assessment, in accordance with the present disclosure. Machine learning model 700 input image 702, extracted ROI 702a, After the pre-processing is complete, a pre-trained machine learning model 700, as shown in FIG. 7 is applied on the extracted ROI 702a from each image 702, which renders a jetting score. This is done in a continuous manner which results in a jetting score being rendered every n frames. The rendered jetting scores are logged and can be displayed in real time to provide information about the jetting quality history. Convolutional Neural Networks (CNNs) are a de-facto standard for analyzing image data and can be customized for a given printing system. While it is possible to train a CNN from scratch, much faster progress can often be made via transfer learning. FIG. 7 shows a case where feature extraction 704 is done via a pre-trained model, henceforth referred to as the base model. The extracted feature vector 706 is then passed through a series of fully-connected (FC) layers 708 to map the extracted features to the desired output. In this step, a two-dimensional image is converted to a one-dimensional vector feature vector 706, which is a representation of the image and in a sense represents how far from a standard the image might be. Apart from the accuracy requirements, one thing that can dictate the choice of the base model is the available computational power. By using a lightweight or scaled down or compressed deep neural network, the computational cost can be significantly reduced which in turn facilitates real time inference. If an unstable jetting result is determined, one or more operations, such as ejecting drops or feeding print material, of the printing system can be paused, and an intervention can be performed on the printing system to avoid continued printing with unstable or poor-quality jetting. Jetting result refers to some quantitative estimate of jetting quality. In the system of the present disclosure, the variance in the average position of the drop in the gap at a fixed time from actuation is observed. For good jetting, for example, this variance is small, and for poor jetting the variance is large. Additionally, the presence off axis displacement of the drops, and satellites (drop breakup) can be considered. The learning system uses human curated examples of various jetting quality scores to learn how to evaluate jetting quality based on these attributes, for example, variance in drop position and off-axis displacement. This can be referred to as a video analytics framework. Framework loosely refers to a set of algorithms that are packaged or compiled in a way to receive the camera image as input and produce a jetting result (as a jetting quality score) as output.

Figure 8:
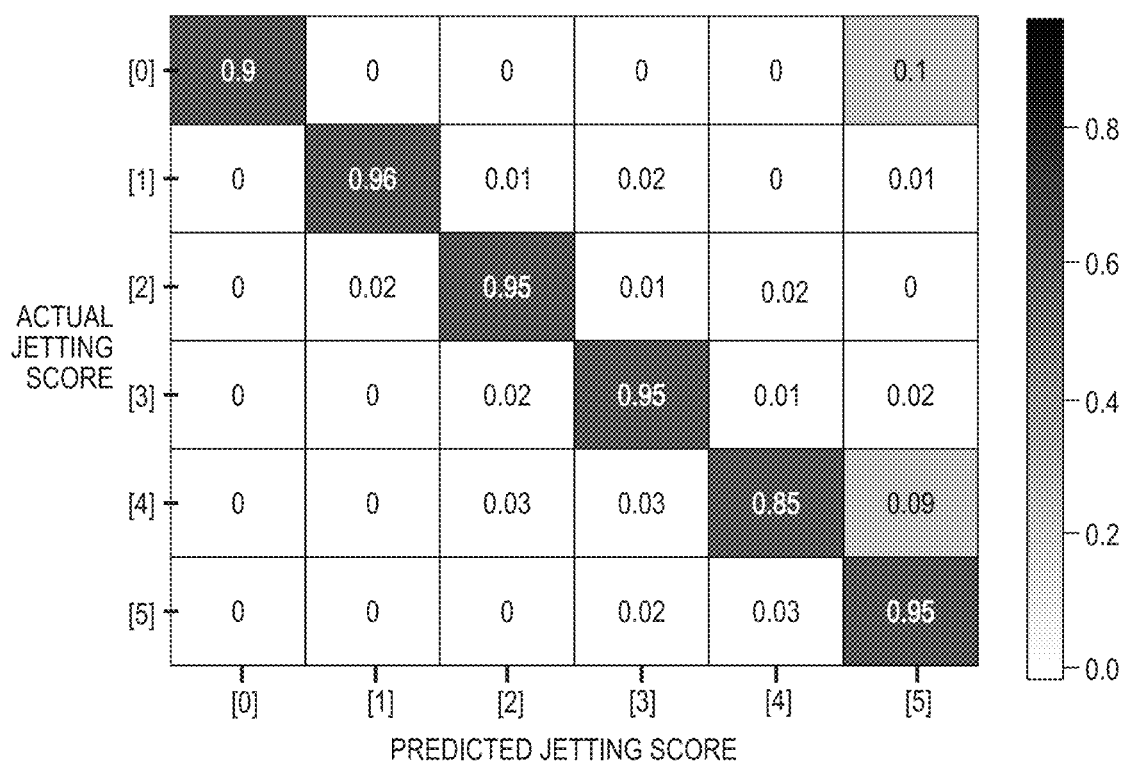
FIG. 8 is a plot of an example confusion matrix of predicted jetting quality scores versus actual scores on test data, in accordance with the present disclosure.

FIG. 8 is a plot of an example confusion matrix of predicted jetting quality scores versus actual scores on test data, in accordance with the present disclosure. The plot shown in FIG. 8 shows the performance of the proposed computer vision system on test data using MobileNet [1] as the base model followed by a custom ANN (artificial neural network). The confusion matrix is obtained by testing on ~2500 ROI images corresponding to different jetting qualities. In certain examples, the model shown in FIG. 8 can be trained by collecting videos and manually labeling. Next, a model is applied to videos not used in the training and scored (x-axis) to establish agreement between the training images and a predicted result. In alternate examples, rather than using feature extraction based on convolution neural networks (CNN), one could deduce features directly from the captured camera frames. An alternate could be to fit a 2D gaussian to the drop image, and use the mean and covariance of the gaussian as features to fit to a model to predict the jetting quality score. CNNs are in general much more powerful than such hand-crafted feature extractors and would work well even when the underlying mean drop images are no longer gaussian-like (e.g. in the case of poor jetting and satellites). CNNs are a specific type of ANN, where some of the layers in the neural networks are convolution filters. CNNs are especially useful when dealing with image data, where perception is often based on the ability to detect edges between objects and surroundings. CNNs result in compact models with fewer parameters to fit compared ANNs.

The present teachings include a high-speed shutter system to evaluate drop performance in a liquid metal jet printer system. The measurement system also includes real time processing of video frames to determine jetting quality, and tracking of jetting quality during a part build to spot anomalies and flag operator for parameter adjustments or perform maintenance routine or other interventions to maintain part build quality and consistency. The disclosed measurement system provides a low-cost camera solution, without requiring a strobe or high-speed camera. A lightweight, with respect to computational power required, video analytics framework is also used, which can be accomplished without specialized hardware, such as a graphics processing unit (GPU), for real time monitoring of the build process to ensure part quality.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A method of inspecting drop ejection in a printing system, comprising:
   capturing an image of each of a plurality of drops of a print material after ejection from an ejector of a printing system;
   creating a temporally averaged image from each image of the plurality of drops of print material; and
   classifying one of the plurality of drops of print material based on the temporally averaged image that was created.

2. The method of claim 1, further comprising using a pretrained convolutional neural network for classifying one of the plurality of drops.

3. The method of claim 1, further comprising comparing the temporally averaged image to another temporally averaged image to classify one of the plurality of drops.

4. The method of claim 1, further comprising extracting a region of interest (ROI) from the image of each of the plurality of drops of print material.

5. The method of claim 4, wherein extraneous image data is reduced from one or more areas of the image surrounding each of the plurality of drops of print material.

6. The method of claim 1, further comprising extracting a region of interest (ROI) from the temporally averaged image from each image of the plurality of drops of print material.

7. The method of claim 6, wherein extraneous image data is reduced from one or more areas of the temporally averaged image surrounding each image of the plurality of drops of print material.

8. The method of claim 1, further comprising capturing of the image of each of a plurality of drops of print material after ejection by from about 1 ms to about 200 ms.

9. The method of claim 1, further comprising illuminating a space between the ejector and a substrate where a three-dimensional part is being built.

10. The method of claim 9, wherein the illuminating is done continuously.

11. The method of claim 1, further comprising:
    indicating an unstable jetting result;
    pausing an operation of the printing system; and
    performing an intervention on the printing system.

12. The method of claim 1, wherein the print material comprises a metal, a metallic alloy, or a combination thereof.

13. The method of claim 1, wherein the print material comprises aluminum.

14. A method of inspecting drop ejection in a printing system, comprising:
    capturing an image of each of a plurality of drops of print material after ejection from an ejector of a printing system;
    creating a temporally averaged image from each image of the plurality of drops of print material;
    extracting a region of interest (ROI) from each temporally averaged image from each image of each of the plurality of drops of print material;

comparing the region of interest (ROI) from a first temporally averaged image to a region of interest (ROI) from a second temporally averaged image to generate a jetting result; and classifying the jetting result of one of the plurality of drops of print material.

15. The method of claim 14, further comprising:
indicating an unstable jetting result;
pausing an operation of the printing system; and
performing an intervention on the printing system.

16. The method of claim 14, further comprising using a pretrained convolutional neural network for classifying the jetting result of one of the plurality of drops of print material.

17. The method of claim 14, further comprising capturing of the image of each of a plurality of drops of print material after ejection by from about 1 ms to about 200 ms.

18. The method of claim 14, further comprising continuously illuminating a space between the ejector and a substrate where a three-dimensional part is being built.

19. The method of claim 14, wherein extraneous image data is reduced from one or more areas of each image of the plurality of drops of print material.

20. A printing system, comprising:
an ejector for jetting a print material, comprising:
a structure defining an inner cavity; and
a nozzle orifice in connection with the inner cavity and configured to pulse to eject one or more drops of liquid print material;
a camera comprising a high-speed shutter wherein the shutter is synchronized to an ejector pulse; and
a video analytic framework coupled to the ejector and the camera configured to generate a jetting result for each of the one or more drops of liquid print material.

21. The printing system of claim 20, further comprising a substrate for receiving one or more drops of liquid print material.

22. The printing system of claim 21, wherein the camera is located in a plane between the ejector and the substrate.

23. The printing system of claim 20, further comprising an electronic circuit connecting the camera to the ejector and configured to trigger the camera after a pulse to eject one or more drops of liquid print material.

24. The printing system of claim 20, wherein the camera is triggered 1 ms to about 200 ms after the pulse to eject one or more drops of liquid print material.

25. The printing system of claim 20, wherein the camera further comprises a long-length focal lens.

26. The printing system of claim 21, further comprising a continuous illumination source configured to illuminate a space between the ejector and the substrate.

27. The printing system of claim 20, wherein the video analytic framework produces an image extraction to generate a jetting result for each of the one or more drops of liquid print material.

28. The printing system of claim 27, wherein the image extraction is a temporal average of more than one image.

29. The printing system of claim 20, wherein the print material comprises a metal, a metallic alloy, or a combination thereof.

* * * * *